3,013,978
Patented Dec. 19, 1961

3,013,978
REMOVAL OF FISSION PRODUCTS FROM WATER
John Rosinski, Cicero, Ill., assignor to the United States of America as represented by the United States Atomic Energy Commission
No Drawing. Filed Sept. 15, 1959, Ser. No. 840,212
1 Claim. (Cl. 252—301.1)

This process deals with the removal of fission product values from aqueous solutions and in particular with the removal of fission product values from ocean water.

With the upcoming use of atomic-powered ships, the problem arises how to avoid excessive contamination of the ocean by fission products. This is of importance, for instance, when one of the fuel elements has been depleted to such a degree that it is not sufficiently concentrated in fuel material to make its use satisfactory and also not to reprocess it for concentration of the fissionable material. In such a case it is desirable to dispose of the fuel element at the bottom of the ocean. Fission product contamination of sea water can also occur by atomic accidents or other mishaps in a nuclear-operated sea vessel.

Beta and gamma emitters will be distributed into the ocean by occurrences of the above-mentioned kind. The predominant radioactive fission products present in contaminated ocean water are $Ba^{140}$, $La^{140}$, $Y^{91}$, $Y^{90}$, $Sr^{89}$, $Sr^{90}$, $Zr^{95}$, $Nb^{95}$, $Ru^{103}$, $Ru^{106}$, $Cs^{137}$, $Ce^{141}$, $Ce^{144}$, $Pr^{143}$, $Pr^{144}$, $Pm^{147}$ and $Sm^{151}$. All of these fission products are beta emitters, and all, with the exception of $Sr^{90}$, $Y^{90}$, $Pr^{143}$ and $Pm^{147}$, are gamma emitters.

Heretofore various scavengers and coagulants have been used for the removal of fission products from highly dilute solutions. Most of the scavenger-coagulant combinations however, proved very unsatisfactory, because they precipitated in the form of a gel-like solid that remained suspended for long periods of time, particularly in moving water, such as ocean water in which strong currents exist. One of the precipitates investigated for fission product removal was a mixture of aluminum hydroxide and ferric hydroxide. The mixed precipitate, for instance, was formed by adding aluminum sec.-butoxide and ferric ethoxide to the fission-products-containing water. It took many hours for this precipitate to settle, and its carrying power for fission products was unsatisfactorily low; in the case of turbulent water, the supernatant still contained 91% of the fission products originally present.

It is an object of this invention to provide a process for the removal of fission products from large bodies of water by carrier precipitation in which only a few minutes are required for settling of the fission-products-containing precipitate to the bottom of the water.

It is another object of this invention to provide a process of removing fission products from a highly dilute solution thereof by means of a carrier precipitate which settles rapidly to the bottom of the water even under turbulent conditions.

It is finally also an object of this invention to provide a process for removing fission products from large bodies of water by means of a carrier precipitate that has a highly adsorptive affinity or other attractive power for most of the fission products present.

These objects are accomplished by incorporating into the fission-products-contaminated water a mixed precipitate of manganese dioxide or chromic oxide and ferric hydroxide obtained by the reaction of a ferrous salt and a manganese- or chromium-containing oxidizing agent which during reduction by the ferrous salt precipitates as the hydroxide. Suitable oxidizing agents are permanganates and dichromates.

Any water-soluble ferrous salt is suitable for the process of this invention; for instance, the sulfate, the acetate, the nitrate and the chloride are satisfactory. However, the sulfate, $FeSO_4.7H_2O$ or anhydrous $FeSO_4$, is the preferred salt for reasons to be explained later. As to settling time, the ferrous chloride was the preferred ferrous salt. Various concentrations have been tested for the process of this invention. It has been found that at least 10 g./m.$^3$ of water of ferrous sulfate or chloride for turbulent ocean water should be added to obtain satisfactory operation; however, with higher quantities the decontamination is expedited. For still water, for instance lake water, quantities as low as 5 g./m.$^3$ have brought about satisfactory fission product removal; in that case, the addition of a flocculating agent is advantageous.

The permanganate anion can either be added in the form of an alkali metal permanganate, such as the potassium or sodium permanganate, or in the form of an alkaline earth permanganate, such as the calcium or barium salt. The permanganate is advantageously added in at least stoichiometric quantities with regard to the ferrous salt, an excess thereof being preferred. The best results were obtained with a molar ratio of permanganate to ferrous ion of 1:3.

The optimal combination of precipitating agents were found to be ferrous sulfate plus an alkaline earth permanganate, because in this case insoluble alkaline earth sulfate is also formed, which accounts for increased carrying of $Sr^{89}$ and $Ba^{140}$. The preferred permanganate is calcium permanganate, $Ca(MnO_4)_2.4H_2O$. While the precipitate is most effective if it is formed in situ, it can also be added as a preformed precipitate.

The pH value of the solution may vary widely, a pH of above 6.5 being preferred. Ocean water usually has a pH value of 8.2.

EXAMPLE I

A series of experiments was carried out for which a so-called "substitute ocean water" was used. The substitute ocean water was prepared by dissolving 245.34 g. of sodium chloride and 40.94 g. of anhydrous sodium sulfate in 8–9 liters of distilled water. To this solution there were then added slowly 200 ml. of stock solution No. 1 (555.6 g. of $MgCl_2.6H_2O$, 57.9 g. of anhydrous $CaCl_2$ and 2.1 g. of $SrCl_2.6H_2O$ per liter of solution) and thereafter 100 ml. of stock solution No. 2 (69.4 g. of KCl, 20.1 g. of $NaHCO_3$, 10.1 g. of KBr, 2.7 g. of $H_3BO_3$ and .3 g. of NaF per liter of solution), both with vigorous stirring. The whole was diluted to 10.0 liters. To these 10 liters of solution there were then added 10 ml. of a stock solution No. 3 containing .099 g. of $Ba(NO_3)_2$, .055 g. of $Mn(NO_3)_2.6H_2O$, .040 g. of $Cu(NO_3)_2.3H_2O$, .015 g. of $Zn(NO_3)_2.6H_2O$, .007 g. of $Pb(NO_3)_2$ and .0005 g. of $AgNO_3$ per liter of solution. To the substitute ocean water thus obtained a nitric acid solution of fission products was then added that was derived from neutron-irradiated uranium. The pH value of this substitute ocean water was adjusted to 8.2 with sodium hydroxide. The initial fission products concentration of the solution was approximately 10$^4$ counts/min./ml. (beta plus gamma). The beta activity consisted of 21% $Ce^{141}$, 10% $Ba^{140}$, 6% $Sr^{89}$, 4.2% $Y^{91}$, 1.5% $Pr^{143}$, 0.3% $Nd^{147}$, the remaining 57% being composed of fission products of a relatively short half-life. The solution contained only traces of $Ru^{103}$ and $Zr^{95}$; the ratio of beta:gamma emission was about 0.6.

The experiments were carried out with varying quantities of calcium permangagate and ferrous sulfate. The supernatants were analyzed for residual fission products, after varying settling times, by counting. Before settling, each sample of experiments Nos. 1–8 was stirred for 1 minute, the sample of experiment 9 was stirred for 4 hours, while the samples of experiments 10–12 each were stirred for 5 minutes. In experiment No. 5 silver nitrate (5 p.p.m.) and in experiment No. 6 lead nitrate (50 p.p.m.) was added to investigate whether the addition of a heavy salt improves settling of the precipitates. The conditions of these twelve experiments and the results obtained are compiled in Table I.

*Table I*

CALCIUM

| Expt. | Concentration, p.p.m. | | Time required for settling | Removal of activity, percent | |
|---|---|---|---|---|---|
| | Permanganate | Ferrous sulfate | | Gamma (gross) | Beta (over 1 m.e.v.) |
| 1 | 25 | 82 | 5 mins. | 71.9 | 72.2 |
| | | | 24 hrs. | 96.5 | 64.6 |
| 2 | 25 | 82 | 5 mins. | 66.2 | 88.2 |
| | | | 24 hrs. | 96.3 | |
| 3 | 50 | 164 | 5 mins. | 94.8 | 88.9 |
| | | | 20 mins. | 95.7 | 89.6 |
| | | | 24 hrs. | 96.1 | 89.7 |
| 4 | 50 | 164 | 5 mins. | 93.5 | 85.4 |
| | | | 20 mins. | 97.2 | 86.5 |
| | | | 24 hrs. | 97.4 | 86.7 |
| 5 | 50 | 164 | 8 mins. | 94.4 | 87.4 |
| | | | 20 mins. | 94.9 | 88.1 |
| | | | 24 hrs. | 95.5 | 88.9 |
| 6 | 50 | 164 | 8 mins. | 94.5 | 88.5 |
| | | | 20 mins. | 95.4 | 89.3 |
| | | | 24 hrs. | 95.9 | 89.5 |

POTASSIUM

| 7 | 10 | 28.8 | 3 mins. | 50.2 | 38.1 |
|---|---|---|---|---|---|
| | | | 3 hrs. | 50.3 | 46.1 |
| | | | 5 hrs. | 57.1 | 55.3 |
| | | | 20 hrs. | 86.4 | 80.8 |
| 8 | 10 | 28.8 | 3 mins. | 53.1 | 54.4 |
| | | | 3 hrs. | 75.3 | 71.4 |
| | | | 5 hrs. | 79.0 | 80.2 |
| | | | 20 hrs. | 86.6 | 79.4 |
| 9 | 10 | 28.8 | 40 hrs. | 90.6 | (1) |
| 10 | 25 | 72 | 5 mins. | 86.6 | 84.4 |
| | | | 20 mins. | 90.0 | 87.4 |
| | | | 20 hrs. | 95.0 | 90.0 |
| 11 | 50 | 144 | 5 mins. | 90.9 | 76.4 |
| | | | 20 mins. | 93.8 | 80.7 |
| | | | 3 hrs. | 94.5 | 82.1 |
| | | | 24 hrs. | 95.4 | 82.0 |
| 12 | 50 | 144 | 5 mins. | 89.4 | 88.0 |
| | | | 20 mins. | 89.9 | 87.3 |
| | | | 3 hrs. | 93.9 | 90.9 |
| | | | 24 hrs. | 95.0 | 91.1 |

¹ Not determined.

It is obvious from the above data that a calcium-sulfate-containing precipitate brings about a better decontamination than the precipitate obtained by reacting potassium permanganate with the ferrous sulfate. The data also show that, in order to obtain complete settling, about 50 p.p.m. of calcium permanganate should be used to remove about 95% of the fission products present within a few minutes, usually less than 20 minutes. In the case of potassium permanganate, settling of the precipitate was slower; however, with 50 p.p.m. of potassium permanganate, about 90% or more of the fission products were removed within 20 minutes. The addition of silver nitrate (experiment No. 5) and of lead nitrate (experiment No. 6) had no effect on degree of decontamination or settling time.

A series of similar experiments but carried out completely while the water was in motion, to simulate ocean conditions, gave analogous results.

Some experiments were carried out by adding, aside from the permanganate and ferrous sulfate, commercially available flocculating agents; however, they did not improve considerably decontamination or settling time if the iron salt added was at least 10 g./m.³.

Other oxidizing agent-ferrous salt combinations were also studied for the removal of fission products. As has been mentioned before, chromate and potassium dichromate were added instead of the permanganate. They were found to be less efficient than is the permanganate-ferrous-sulfate combination.

EXAMPLE II

Another series of experiments was carried out with solutions that contained one or two fission products only. This was done in order to determine the operativeness of the process with respect to individual fission products. For this purpose samples of the same substitute sea water were used as that employed in Example I, and a nitrate solution of the fission product or fission products to be investigated was added until the radioactivity amounted to from $10^4$ to $10^5$ counts/min./ml. The molar ratio of permanganate to ferrous ion in all these runs was 1:3. Other conditions of the experiments, such as the type of ferrous salt used, type of fission products added, initial and final pH values of the sea water and amount of permanganate added, are shown in Table II; the results obtained after different settling times are also compiled therein.

*Table II*

| Fission product | Fe⁺⁺ salt | KMnO₄, p.p.m. | pH initial-final | Settling time, hours | Fission products removed, percent |
|---|---|---|---|---|---|
| Ce-Pr-144 | Sulfate | 10 | 6.9- 6.8 | 2.5 | 52.9 |
| | | | | 5 | 62.7 |
| | | | | 24 | 86.5 |
| | do | 10 | 8.2- 7.7 | 2.5 | 36.7 |
| | | | | 5 | 62.2 |
| | | | | 24 | 89.3 |
| | do | 10 | 9.9- 9.5 | 2.5 | 28.1 |
| | | | | 5 | 63.6 |
| | | | | 24 | 92.5 |
| | do | 50 | 8.2- 7.9 | 2.5 | 90.0 |
| | | | | 5 | 92.6 |
| | | | | 24 | 98.3 |
| | do | 100 | 8.2- 7.7 | 2.5 | 97.7 |
| | | | | 5 | 98.4 |
| | | | | 24 | 99.6 |
| | Chloride | 10 | 7.0- 7.0 | 2.5 | 92.0 |
| | | | | 5 | 98.2 |
| | | | | 24 | 98.6 |
| | do | 10 | 8.2- 8.2 | 2.5 | 94.5 |
| | | | | 5 | 98.2 |
| | | | | 24 | 99.6 |
| | do | 10 | 10.0- 9.5 | 2.5 | 91.7 |
| | | | | 5 | 96.3 |
| | | | | 24 | 98.4 |
| | do | 50 | 8.2- 8.0 | 2.5 | 97.6 |
| | | | | 5 | 99.0 |
| | | | | 24 | 99.7 |
| | do | 100 | 8.2- 7.6 | 2.5 | 99.8 |
| | | | | 5 | 99.8 |
| | | | | 24 | 99.9 |
| Zr-Nb-95 | Sulfate | 10 | 7.0- 6.9 | 2.5 | 85.2 |
| | | | | 5 | 85.9 |
| | | | | 24 | 93.9 |
| | do | 10 | 8.2- 7.8 | 2.5 | 21.8 |
| | | | | 5 | 72.4 |
| | | | | 24 | 95.4 |
| | Sulfate | 10 | 8.2- 8.0 | 24 | 88.4 |
| | Chloride | 10 | 8.2- 8.0 | 24 | 93.1 |
| | Sulfate | 10 | 10.0- 9.7 | 2.5 | 77.2 |
| | | | | 5 | 83.4 |
| | | | | 24 | 93.4 |
| | do | 50 | 8.2- 7.8 | 2.5 | 97.2 |
| | | | | 5 | 98.0 |
| | | | | 24 | 99.3 |
| | do | 100 | 8.2- 8.0 | 2.5 | 98.8 |
| | | | | 5 | 99.1 |
| | | | | 24 | 99.0 |
| | Chloride | 100 | 8.2- 7.8 | 5 | 99.1 |
| Y-91 | Sulfate | 10 | 8.2- 8.0 | | 55.2 |
| | do | 10 | 7.0- 7.5 | 2.5 | 73.3 |
| | | | | 5 | 96.3 |
| | | | | 24 | 68.7 |
| | do | 10 | 8.2- 8.5 | 2.5 | 80.4 |
| | | | | 5 | 98.5 |
| | | | | 24 | 85.9 |
| | do | 10 | 10.0- 9.4 | 2.5 | 91.8 |
| | | | | 5 | 98.9 |
| | | | | 24 | 85.5 |
| | do | 50 | 8.2- 7.2 | 2.5 | 90.4 |
| | | | | 5 | 96.2 |
| | | | | 24 | 30.5 |
| | do | 100 | 8.2- 4.4 | 2.5 | 27.8 |
| | | | | 5 | 23.4 |
| | | | | 24 | 99.2 |
| | do | 100 | 8.2- 7.5 | 2.5 | 99.5 |
| Ru-103 | do | 10 | 7.0- 7.0 | 2.5 | 85.4 |
| | | | | 5 | 91.2 |
| | | | | 24 | 95.2 |
| | do | 10 | 8.2- 8.0 | 2.5 | 82.5 |
| | | | | 5 | 89.3 |
| | | | | 24 | 92.6 |
| | do | 10 | 10.0-10.0 | 2.5 | 88.7 |
| | | | | 5 | 92.7 |
| | | | | 24 | 94.7 |
| | do | 50 | 8.2- 7.8 | 2.5 | 93.0 |
| | | | | 5 | 95.2 |
| | | | | 24 | 96.3 |
| | do | 100 | 8.2- 8.0 | 2.5 | 92.2 |
| | | | | 5 | 95.9 |
| | | | | 24 | 96.2 |

The above data show that, using potassium permanganate, the ferrous chloride brought about better decontamination than did the sulfate.

It will be understood that this invention is not to be limited to the details given herein but that it may be modified within the scope of the appended claim.

What is claimed is:

A process of decontaminating a body of water from dissolved fission products including lanthanide rare earths and alkaline earth metals, consisting in adjusting the pH value of the water to above 6.5 and incorporating into said water calcium permanganate and ferrous sulfate in a molar ratio of about 1:3, whereby a mixed precipitate of manganese dioxide, ferric hydroxide and calcium sulfate forms and the fission products are carried by said mixed precipitate, and the precipitate carrying the fission products settles to the bottom of said body of water.

References Cited in the file of this patent

UNITED STATES PATENTS

| | | |
|---|---|---|
| 2,847,278 | Wilson | Aug. 12, 1958 |
| 2,849,467 | Glendenin et al. | Aug. 26, 1958 |
| 2,860,949 | Beaufait et al. | Nov. 18, 1958 |
| 2,931,701 | Faris | Apr. 5, 1960 |

FOREIGN PATENTS

| | | |
|---|---|---|
| 977,591 | France | June 4, 1952 |
| 1,045,628 | France | July 1, 1953 |

OTHER REFERENCES

Morton et al.: "J. American Water Works Association," vol. 48, pages 545–558 (1956), 210–42.

Bruce et al.: "Process Chemistry," vol. 2, pp. 251–255, Pergamon Press, 1958. Copy in POSL. TK 9350 B7.